(12) United States Patent
Lin et al.

(10) Patent No.: US 7,598,644 B2
(45) Date of Patent: Oct. 6, 2009

(54) BUFFER STRUCTURE FOR HEAT DISSIPATING FAN

(75) Inventors: Yeu-Lih Lin, Taipei Hsien (TW); Ying-Min Huang, Taipei Hsien (TW); Zhi-Ya Yang, Shenzhen (CN); Zhi-Jian Peng, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 147 days.

(21) Appl. No.: 11/842,908

(22) Filed: Aug. 21, 2007

(65) Prior Publication Data

US 2009/0051231 A1   Feb. 26, 2009

(51) Int. Cl.
*H02K 7/09* (2006.01)
(52) U.S. Cl. ........................ 310/90.5; 310/90
(58) Field of Classification Search ............ 310/90.5, 310/90, 67 R; 384/511
See application file for complete search history.

(56) References Cited

U.S. PATENT DOCUMENTS

| | | | | |
|---|---|---|---|---|
| 4,655,616 A * | 4/1987 | Ducan | ........................ | 384/446 |
| 5,982,066 A * | 11/1999 | Marracino et al. | ............ | 310/91 |
| 5,997,183 A | 12/1999 | Horng | | |
| 6,023,113 A * | 2/2000 | Otsuka | ...................... | 310/67 R |
| 6,420,810 B1 * | 7/2002 | Jeong | ........................ | 310/90.5 |
| 7,105,967 B2 * | 9/2006 | Huang et al. | ................ | 310/90.5 |
| 7,462,950 B2 * | 12/2008 | Hu | ................................ | 290/55 |
| 2006/0267435 A1 | 11/2006 | Lin et al. | | |

* cited by examiner

*Primary Examiner*—Dang D Le
(74) *Attorney, Agent, or Firm*—Frank R. Niranjan

(57) ABSTRACT

A heat dissipating fan includes a housing (201), a stator (21), a rotor (27) and a buffer structure. The housing defines an accommodating space (202) and includes a hollow tube (201*b*). The tube encloses first and second bearings (22, 23) therein. The stator is arranged in the accommodating space and around the tube. The rotor has a shaft rotatably disposed in the first and the second bearings. The buffer structure includes at least a pair of magnets (25, 26) received in the tube and located between the first and second bearings. Repellent force is generated between the magnets, thereby preventing at least one of the first and the second bearing from being damaged by an accidental force acting thereon.

14 Claims, 6 Drawing Sheets

US 7,598,644 B2

BUFFER STRUCTURE FOR HEAT DISSIPATING FAN

BACKGROUND OF THE INVENTION

1. Field of the Invention

The present invention relates generally to heat dissipating fans, and more particularly to a buffer structure for a heat dissipating fan.

2. Description of Related Art

Referring to FIG. 6, a heat dissipating fan according to a related art is shown. The heat dissipating fan includes a motor stator 11, a rotor 15 rotatably disposed around the motor stator 11, and a pair of bearings 12, 13 for supporting a shaft 151 of the rotor 15. The motor stator 11 includes a hollow tube 111, which accommodates the bearings 12, 13 at top and bottom sections thereof. A coil spring 14 is positioned between a top surface of the bearing 12 and a bottom surface of a middle portion of the rotor 15.

In the heat dissipating fan, the bearing 13 is fixedly mounted at the bottom section of the tube 11 without a buffer structure. When the rotor 15 undergoes an upward force, the bearing 13 will be damaged due to the upward force. Therefore, there is a need to provide a heat dissipating fan having a better buffer structure.

SUMMARY OF THE INVENTION

The present invention relates to a heat dissipating fan. The heat dissipating fan includes a housing, a stator, a rotor and a buffer structure. The housing defines an accommodating space and includes a hollow tube. The tube encloses first and second bearings therein. The stator is arranged in the accommodating space and around the tube. A shaft of the rotor is rotatably disposed in the first and the second bearings. The buffer structure includes at least a pair of magnets. Repellent force is generated between the magnets, thereby preventing at least one of the first and the second bearing from being damaged by an accidental force acting thereon.

Other advantages and novel features of the present invention will become more apparent from the following detailed description of first embodiments when taken in conjunction with the accompanying drawings, in which:

DETAILED DESCRIPTION OF THE INVENTION

Figure 1:
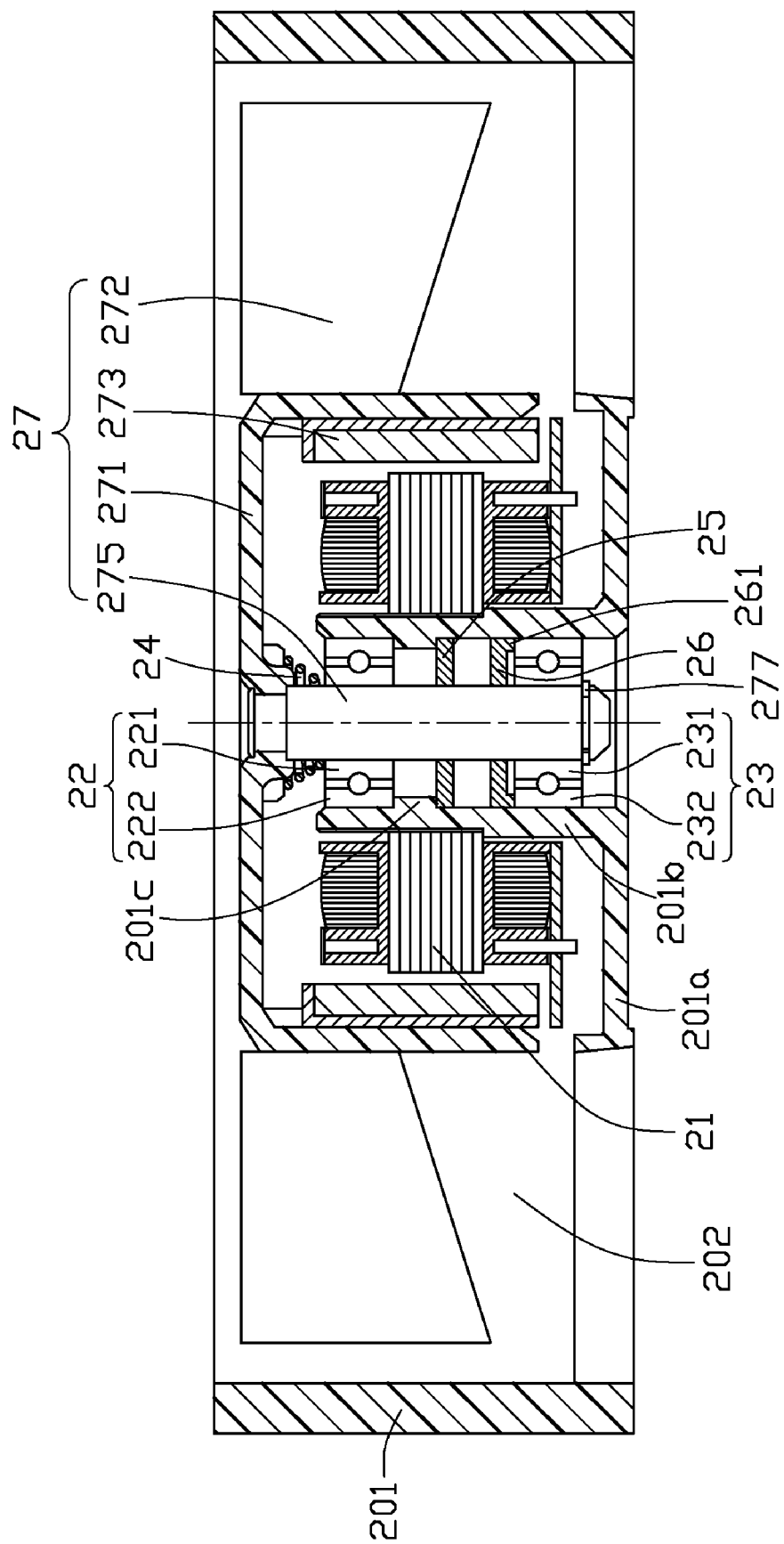
FIG. 1 is a cross sectional view of a heat dissipating fan in accordance with a preferred embodiment of the present invention.

Reference will now be made to the drawing figures to describe the first embodiment in detail.

Referring to FIG. 1, a heat dissipating fan in accordance with a preferred embodiment of the present invention is shown. The heat dissipating fan includes a housing 201, a rotor 27 and a stator 21 mounted in the housing 201, and a pair of ball bearings (i.e. first and second bearings 22, 23) supporting the rotor 27 to rotate in the housing 201.

The housing 201 is rectangular shaped in profile and defines an accommodating space 202 therein. The stator 21 and the rotor 27 are received in the accommodating space 202. The housing 201 includes a motor seat 201a which extends a central tube 201b from a middle portion thereof. The stator 21 is mounted around the central tube 201b, whilst the first and the second bearings 22, 23 are mounted in the central tube 201b. The central tube 201b extends an annular protrusion 201c inwardly from a middle portion of an inner surface of the central tube 201b.

The rotor 27 includes a hub 271, a plurality of blades 272 radially and outwardly extending from the hub 271, a magnet ring 273 disposed in an inner wall of the hub 271, and a shaft 275 fixed to a central portion of the hub 271. The shaft 275 is rotatably received in the first and the second bearings 22, 23.

The first and the second bearings 22, 23 each include an annular inner wall 221, 231, an annular outer wall 222, 232 surrounding the inner wall 221, 231, and a plurality of balls sandwiched between the inner wall 221, 231 and the outer wall 222, 232. The first bearing 22 is mounted above the protrusion 201c of the central tube 201b, with a bottom surface of the outer wall 222 of the first bearing 22 contacting with a top surface of the protrusion 201c. A coil spring 24 is arranged between a top surface of the inner wall 221 of the first bearing 22 and a bottom surface of the central portion of the hub 271. The second bearing 23 is mounted below the protrusion 201c, with a pair of magnets (first and second magnets 25, 26) being sandwiched between a bottom surface of the protrusion 201c and a top surface of the second bearing 23, wherein a top surface of the outer wall 232 of the second bearing 23 contacts with the second magnet 26.

The first and the second magnets 25, 26 each have a ring-like configuration. Inner surfaces of the first and the second magnets 25, 26, which face the shaft 275, each are spaced a distance from an outer surface of the shaft 275, thereby preventing the shaft 275 and the first and the second magnets 25, 26 from being abraded during rotation of the shaft 275. The first magnet 25 is located below and contacts with the bottom surface of the protrusion 201c. The second magnet 26 is slidably located below the first magnet 25 and has an annular projection 261 which contacts with the top surface of the outer wall 232 of the second bearing 23. Each of the first and the second magnets 25, 26 has two magnet poles at top and bottom portions thereof. The bottom portion of the first magnet 25 is homopolar with the top portion of the second magnet 26 so that a repellent force is generated therebetween, which keeps the first magnet 25 spacing a distance from the second magnet 26.

In assembly of the heat dissipating fan, the shaft 275 extends through the coil spring 24, the first bearing 22, the first magnet 25, the second magnet 26 and the second bearing 23 in that order. A snap ring 277 snaps a bottom of the shaft 275 and abuts against a bottom surface of the inner wall 231 of the second bearing 23, thereby preventing the shaft 275 from escaping from the first and the second bearings 22, 23.

In the present heat dissipating fan, the coil spring 24 and the pair of magnets 25, 26 cooperatively form a buffer structure for the heat dissipating fan. The coil spring 24 is disposed between the first bearing 22 and the hub 271 of the rotor 27, whilst the pair of magnets 25, 26 is disposed between the protrusion 201c and the second bearing 23. If the heat dissipating fan undergoes an accidentally upward force, the second bearing 23 is driven to move upwardly due to the upward force and the distance between the first and the second magnets 25, 26 is decreased. Meanwhile, the repellent force between the first and the second magnets 25, 26 increases due to the decrease of the distance therebetween. The increased repellent force pushes the second bearing 23 to move downwardly and return to its original position when the upward force is removed. If the heat dissipating fan undergoes an accidentally downward force, the rotor 27 is driven to move downwardly and press the coil spring 24 to deform. A resilient force is generated due to the deformation of the coil spring 24. The resilient force pushes the rotor 27 to move upwardly and return to its original portion when the downward force is removed. Therefore, the upward or downward force exerted on the heat dissipating fan is buffered due to the buffer structure thereof; thus, the first and the second bearings 22, 23 are prevented from being damaged.

In the present heat dissipating fan, the coil spring 24 is disposed between the first bearing 22 and the rotor 27 to buffer the downward force. Alternatively, other resilient member such as a leaf spring, a rubber cushion or a silicone cushion can be disposed between the first bearing 22 and the rotor 27 to buffer the downward force.

Figure 2:
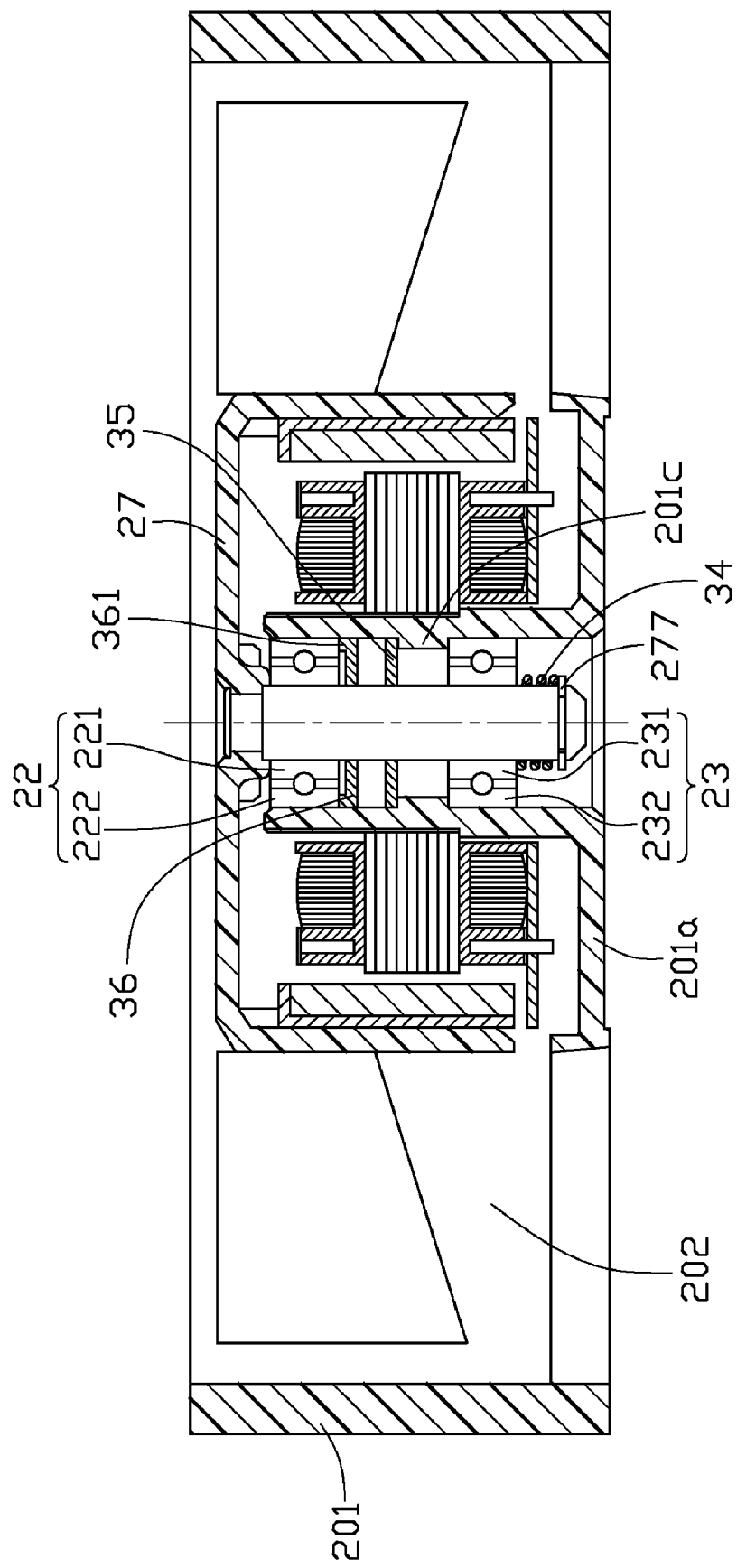
FIG. 2 is a cross sectional view of a heat dissipating fan in accordance with a second embodiment of the present invention.

Referring to FIG. 2, a second embodiment of the present heat dissipating fan is shown. The difference between this embodiment from the first embodiment is: the first and the second the magnets 35, 36 are disposed between the protrusion 201c and the first bearing 22, while a coil spring 34 is disposed between the snap ring 277 and the bottom surface of the inner wall 231 of the second bearing 23. The first magnet 25 is arranged above and contacts with the top surface of the protrusion 201c. The second magnet 36 is arranged above the first magnet 35, with a projection 361 thereof contacting with a bottom surface of the outer wall 222 of the first bearing 22. Meanwhile, the top surface of the inner wall 221 of the first bearing 22 contacts with the bottom surface of the central portion of the hub 271 of the rotor 27.

Figure 3:
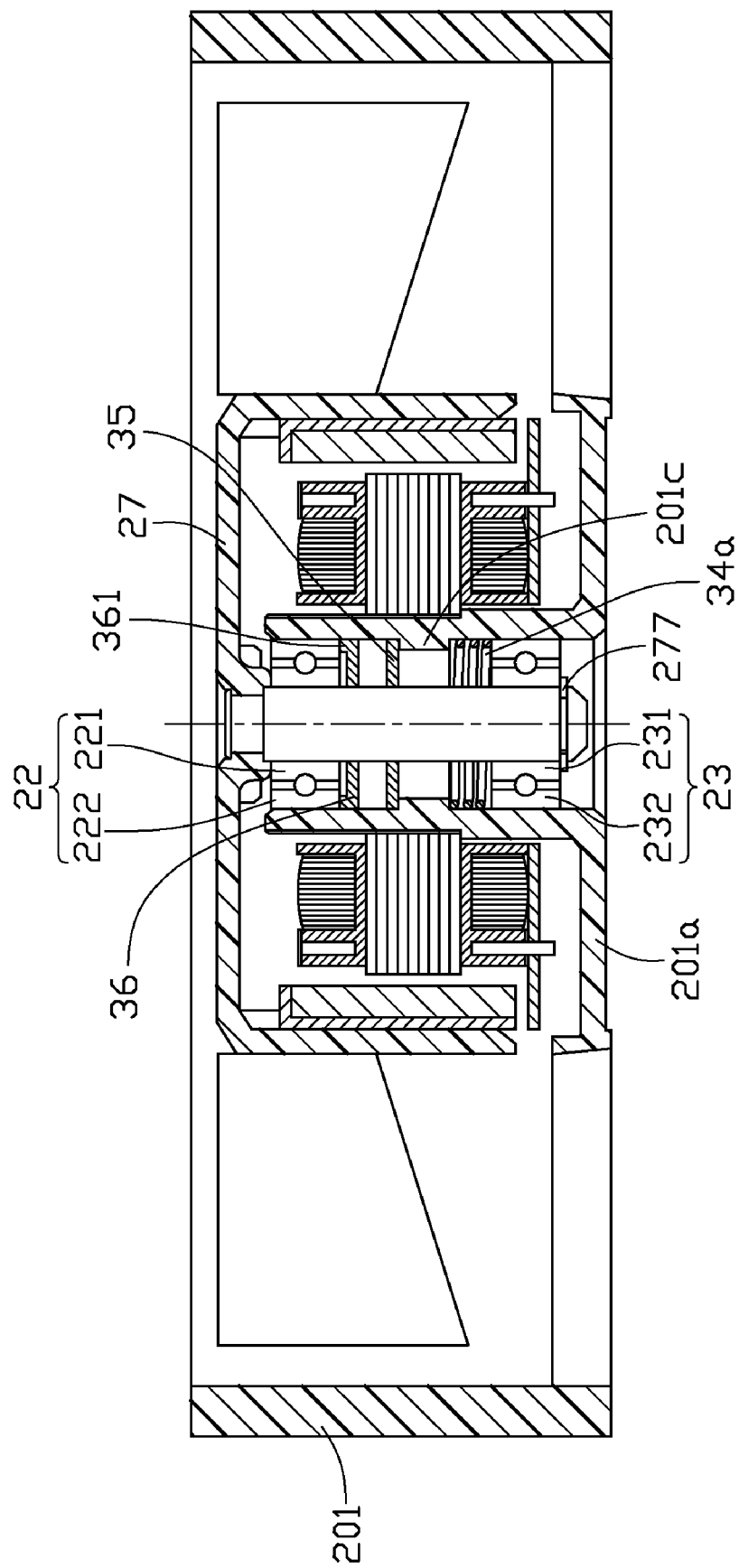
FIG. 3 is a cross sectional view of a heat dissipating fan in accordance with a third embodiment of the present invention.

Referring to FIG. 3, a third embodiment of the present heat dissipating fan is shown. The difference between this embodiment from the second embodiment is: the coil spring 34a in this embodiment has greater diameter than the coil spring 34 in the second embodiment. The coil spring 34a is arranged between the bottom surface of the protrusion 201c and the top surface of the second bearing 23.

Figure 4:
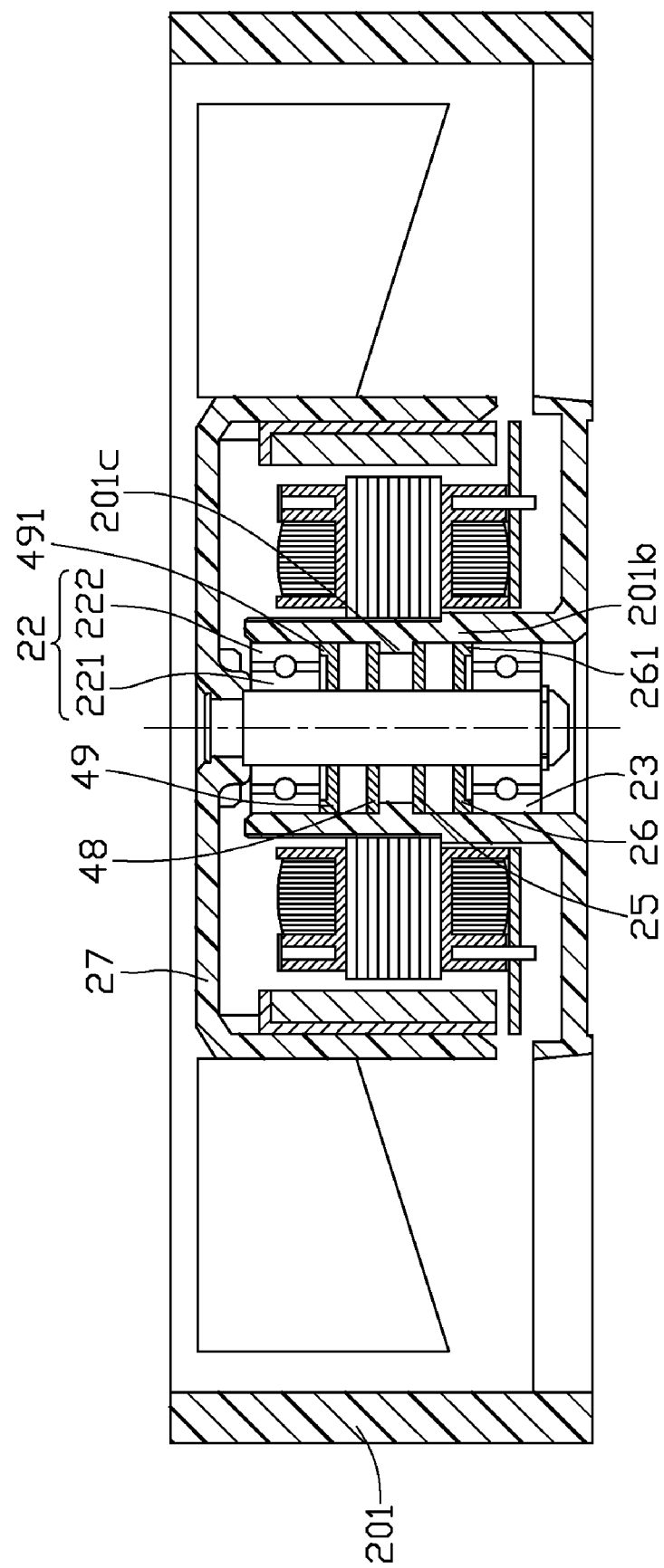
FIG. 4 is a cross sectional view of a heat dissipating fan in accordance with a fourth embodiment of the present invention.

Referring to FIG. 4, a fourth embodiment of the present heat dissipating fan is shown. In this embodiment, there are two pairs of magnets (i.e. first, second, third and fourth magnets 25, 26, 48, 49) respectively disposed between the top and the bottom surfaces of the protrusion 201c and the corresponding first and second bearings 22, 23, and the top surface of the inner wall 221 of the first bearing 22 contacts with the bottom surface of the central portion of the hub 271 of the rotor 27. The arrangement of the lower pair of magnets 25, 26 below the protrusion 201c is similar to the arrangement of the pair of magnets 25, 26 in the first embodiment. The arrangement of the upper pair of magnets 48, 49 is symmetrical with the arrangement of the lower pair of magnets 25, 26 with respect to the protrusion 201c. The fourth magnet 49 includes a projection 491 extending upwardly from a periphery thereof, and the second magnet 26 includes a projection 261 extending downwardly from a periphery thereof. The projections 491, 261 of the fourth and the second magnets 49, 26 respectively contact with the bottom surface of the outer wall 222 of the first bearing 22 and the top surface of the outer wall 232 of the second bearing 23.

Figure 5:
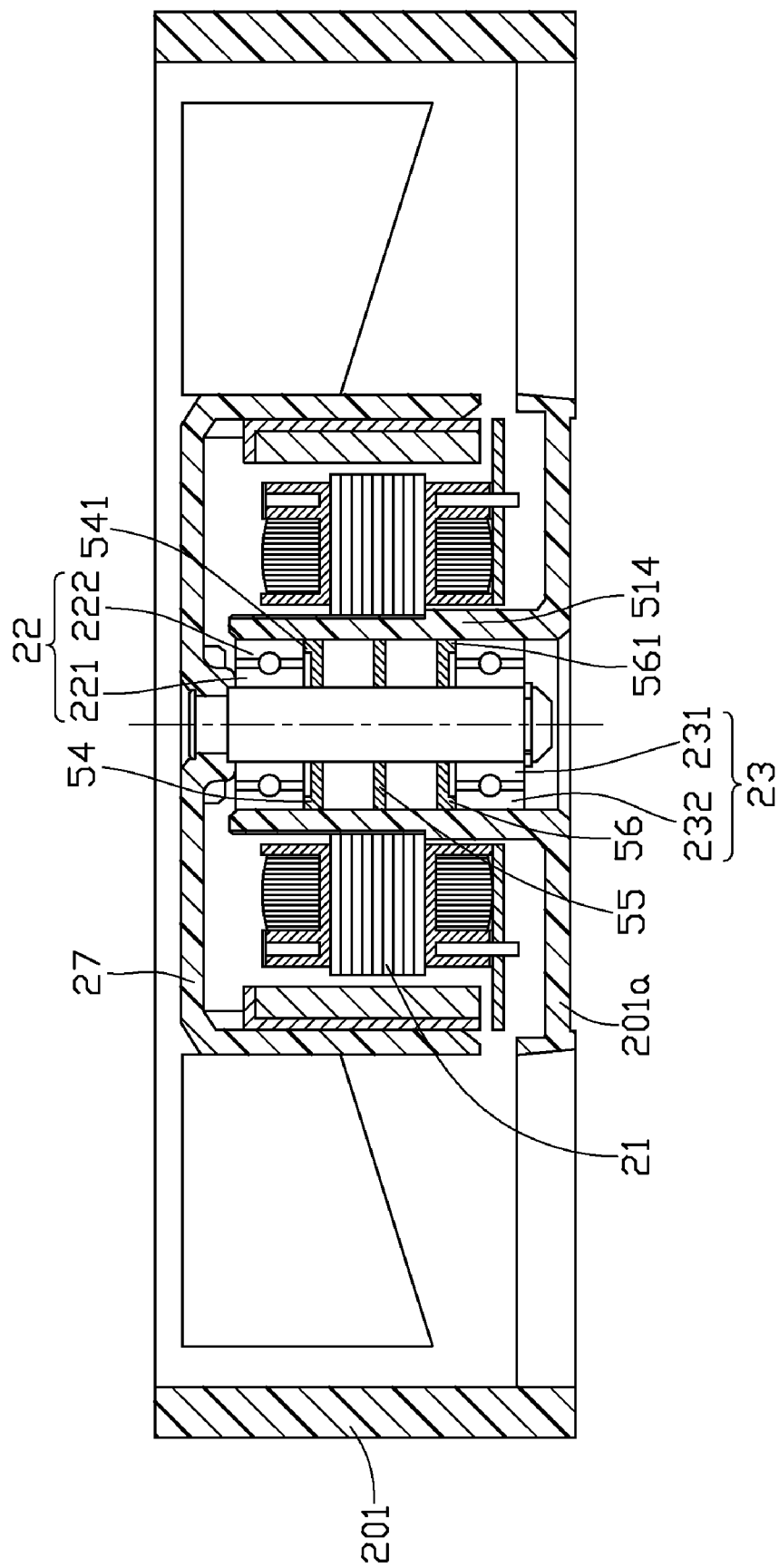
FIG. 5 is a cross sectional view of a heat dissipating fan in accordance with a fifth embodiment of the present invention.
Figure 6:
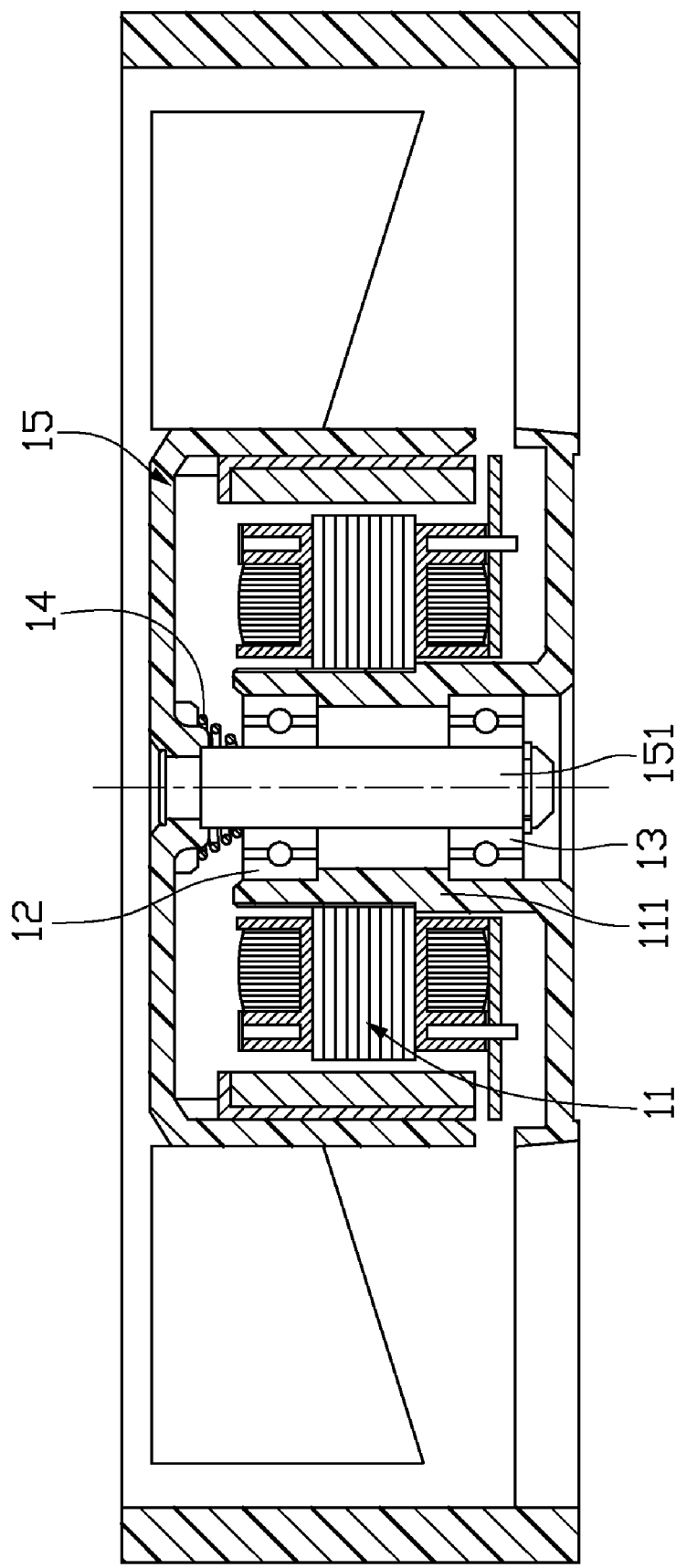
FIG. 6 is a cross sectional view of a related heat dissipating fan.

Referring to FIG. 5, a fifth embodiment of the present heat dissipating fan is shown. In this embodiment, the buffer structure includes three magnets, i.e., first, second and third magnets 54, 55, 56. The second magnet 55 is fixed to the middle portion of the central tube 514. The first and the third magnets 54, 56 are respectively arranged above and below the second magnet 55. The first magnet 54 upwardly extends a protrusion 541 from a periphery thereof; the protrusion 541 contacts with the bottom surface of the outer wall 222 of the first bearing 22. The third magnet 56 downwardly extends a protrusion 561 from a periphery thereof; the protrusion 561 contacts with the top surface of the outer wall 232 of the second bearing 23. A top portion of the second magnet 55 is homopolar with a bottom portion of the first magnet 54, whilst a bottom portion of the second magnet 55 is homoploar with a top portion of the third magnet 56. Repellent forces are generated between the first and the second magnets 54, 55, and the second and the third magnets 55, 56, thereby keeping spaces formed between the first and the second magnets 54, 55, and the second and the third magnets 55, 56.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A heat dissipating fan comprising:
   a housing defining an accommodating space and comprising a hollow tube, the tube enclosing first and second bearings therein, one of the first and second bearings being moveable along an axial direction of the tube;
   a stator arranged in the accommodating space and around the tube;
   a rotor having a shaft rotatably disposed in the first and the second bearing; and
   a buffer structure comprising a pair of magnets received in the hollow tube and located between the first and second bearings, the magnets each having two opposite magnet poles vertically arranged along the shaft, one of the magnets contacting with one of end surfaces of the one of the first and second bearings, the one of the magnets attached to the one of the first and second bearings to move with the one of the first and second bearings, the other one of the magnets being spaced from the first and second bearings and located between the other one of the first and second bearings and the one of the magnets, repellent force being generated between the magnets along the axial direction of the tube for cushioning an accidental force exerted on the one of the first and second bearings thereby preventing the one of the first and second bearings from moving towards the other one of the magnets.

2. The heat dissipating fan as described in claim 1, wherein the buffer structure further comprises a resilient member, the resilient member being selected from a group consisting of coil spring, leaf spring, rubber cushion and silicone cushion.

3. The heat dissipating fan as described in claim 1, wherein the tube extends a protrusion from an inner surface thereof, and the buffer structure further comprises a resilient member, the magnets being disposed below the protrusion and between the protrusion and the one of the first and second bearings, the resilient member being disposed above the protrusion and between the other one of the first and second bearings and the rotor, the other one of the magnets abutting the protrusion at a bottom side of the protrusion, and the other one of the first and second bearings abutting the protrusion at a top side of the protrusion.

4. The heat dissipating fan as described in claim 3, wherein each of the first bearing and the second bearing is a ball bearing which comprises an inner ring connected to the shaft, an outer ring around the shaft and a plurality of balls between the inner ring and the outer ring, the one of the magnets comprising a main body and an annular projection extending downwardly from an outer periphery of the main body to abut the outer ring of the one of the first and second bearings.

5. The heat dissipating fan as described in claim 4, wherein a top end of the resilient member abuts against the rotor around a top end of shaft, and a bottom end of the resilient member abuts against the other one of the first and second bearings.

6. The heat dissipating fan as described in claim 1, wherein the tube extends a protrusion from an inner surface thereof, and the buffer structure further comprises a resilient member, the magnets being disposed above the protrusion and between the protrusion and the one of the first and second bearings, the resilient member being disposed below the protrusion and between the other one of the first and second bearings and a snap ring snapping a bottom of the shaft of the rotor, the other one of the magnets abutting the protrusion at a top side of the protrusion, and the other one of the first and second bearings abutting the protrusion at a bottom side of the protrusion.

7. The heat dissipating fan as described in claim 6, wherein each of the first bearing and the second bearing is a ball bearing which comprises an inner ring connected to the shaft, an outer ring around the shaft and a plurality of balls between the inner ring and the outer ring, the one of the magnets comprising a main body and an annular projection extending upwardly from an outer periphery of the main body to abut the outer ring of the one of the first and second bearings.

8. The heat dissipating fan as described in claim 7, wherein a top end of the resilient member abuts against a bottom surface of the other one of the first and second bearings, and a bottom end of the resilient member abuts against the snap ring.

9. The heat dissipating fan as described in claim 1, wherein the tube extends a protrusion from an inner surface thereof, and the buffer structure further comprises a resilient member, the magnets being disposed above the protrusion and between the protrusion and the one of the first and second bearings, the resilient member being disposed below the protrusion and between the protrusion and the other one of the first and second bearings, a snap ring snapping a bottom of the shaft of the rotor and contacting with a bottom side of the other one of the first and second bearings, the other one of the magnets abutting the protrusion at a top side of the protrusion, and the resilient member having a top end abutting a bottom side of the protrusion and a bottom end abutting a top side of the other one of the first and second bearings.

10. The heat dissipating fan as described in claim 1, wherein the tube extends a protrusion from an inner surface thereof, and the buffer structure further comprises another pairs of magnets, the pairs of magnets being respectively disposed between the protrusion and the first and second bearings.

11. The heat dissipating fan as described in claim 10, wherein the tube extends a protrusion from an inner surface thereof, the pair of magnets being disposed at a top side of the protrusion, the another pair of magnets being disposed at a bottom side of the protrusion, the other one of each pair of magnets abutting the protrusion, the one of each pair of magnets comprising a main body and an annular projection extending from an outer periphery of the main body to contact with a corresponding bearing.

12. The heat dissipating fan as described in claim 1, wherein the buffer structure further comprises a third magnet attached to the other one of the first and second bearings, the other one of the magnets being fixed to the tube, the one of the magnets and the third magnet being slidably arranged at two sides of the other one of the magnets.

13. The heat dissipating fan as described in claim 12, wherein an annular projection extends perpendicularly from an outer periphery of each of the one of the magnets and the third magnet to abut a corresponding bearing.

14. A heat dissipating fan comprising:
a housing having a central tube;
a stator mounted around the central tube;
first and second bearings received in the central tube and spaced from each other a distance;
at least two magnets received in the central tube, located between the first and second bearings and generating a repellent force therebetween along an axial direction of the tube; and
a rotor having a hub, a shaft extending from the hub to rotatably fit in the first and second bearings and blades extending radially and outwardly from the hub;
wherein each magnet having two magnetic poles formed at two opposite ends thereof in the axial direction of the tube, at least one of the at least two magnets contacting with and moveable with one of the first bearing and the second bearing.

* * * * *